(12) United States Patent  
Zhu et al.

(10) Patent No.: US 8,456,834 B2  
(45) Date of Patent: Jun. 4, 2013

(54) ELECTRONIC DEVICE WITH SUPPORT

(75) Inventors: Hong-Wei Zhu, Shenzhen (CN);  
Chieh-Yu Lee, Taipei Hsien (TW);  
Hai-Yang Yu, Shenzhen (CN);  
Er-Zheng Zhao, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 231 days.

(21) Appl. No.: 12/878,956

(22) Filed: Sep. 9, 2010

(65) Prior Publication Data

US 2011/0182007 A1    Jul. 28, 2011

(30) Foreign Application Priority Data

Jan. 26, 2010  (CN) .......................... 2010 1 0300700

(51) Int. Cl.  
*H05K 5/00*     (2006.01)  
*H05K 7/00*     (2006.01)  
*G06F 1/16*     (2006.01)

(52) U.S. Cl.  
USPC ............ 361/679.56; 361/679.21; 361/679.22; 361/679.26; 361/679.3; 361/679.55

(58) Field of Classification Search  
USPC ............... 361/679.21, 679.22, 679.26, 679.3, 361/679.55, 679.56  
See application file for complete search history.

(56) References Cited

U.S. PATENT DOCUMENTS

2004/0021051 A1* 2/2004 Chiu .............................. 248/371  
2004/0041851 A1* 3/2004 Lu ................................. 345/905  
2005/0001114 A1* 1/2005 Ogawa ......................... 248/127  
2006/0049327 A1* 3/2006 Chen ............................ 248/371

\* cited by examiner

*Primary Examiner* — Anthony Haughton  
(74) *Attorney, Agent, or Firm* — Altis Law Group, Inc.

(57) ABSTRACT

An electronic device includes a main body and a support. The support includes a rotary socket, a retaining ring, a fixing cover, a support member, and a shaft. The rotary socket and the retaining ring are fixed to the main body via the fixing cover, the rotary socket is limited to rotate within the retaining ring, and the shaft rotatably connects the support member to the rotary socket. The support member is capable of being rotated to support the electronic device in a landscape orientation and a portrait orientation.

11 Claims, 13 Drawing Sheets

US 8,456,834 B2

1

ELECTRONIC DEVICE WITH SUPPORT

BACKGROUND

1. Technical Field

The present disclosure relates to electronic devices and, particularly, to an electronic device having a support.

2. Description of Related Art

To support an electronic device such as a digital photo frame on a surface, a support is usually used. Most supports can only be orientated to support the devices either in portrait or in landscape position, this is inconvenient as many photos stored in a device are created to be portrait displayed or to be landscape displayed. This causes even further inconvenience for the user to add only portrait or only landscape pictures to the photo frame that can only be placed in an unsuitable position.

Therefore, some improvements are needed in the art.

BRIEF DESCRIPTION OF THE DRAWINGS

Many aspects of the present disclosure should be better understood with reference to the following drawings. The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
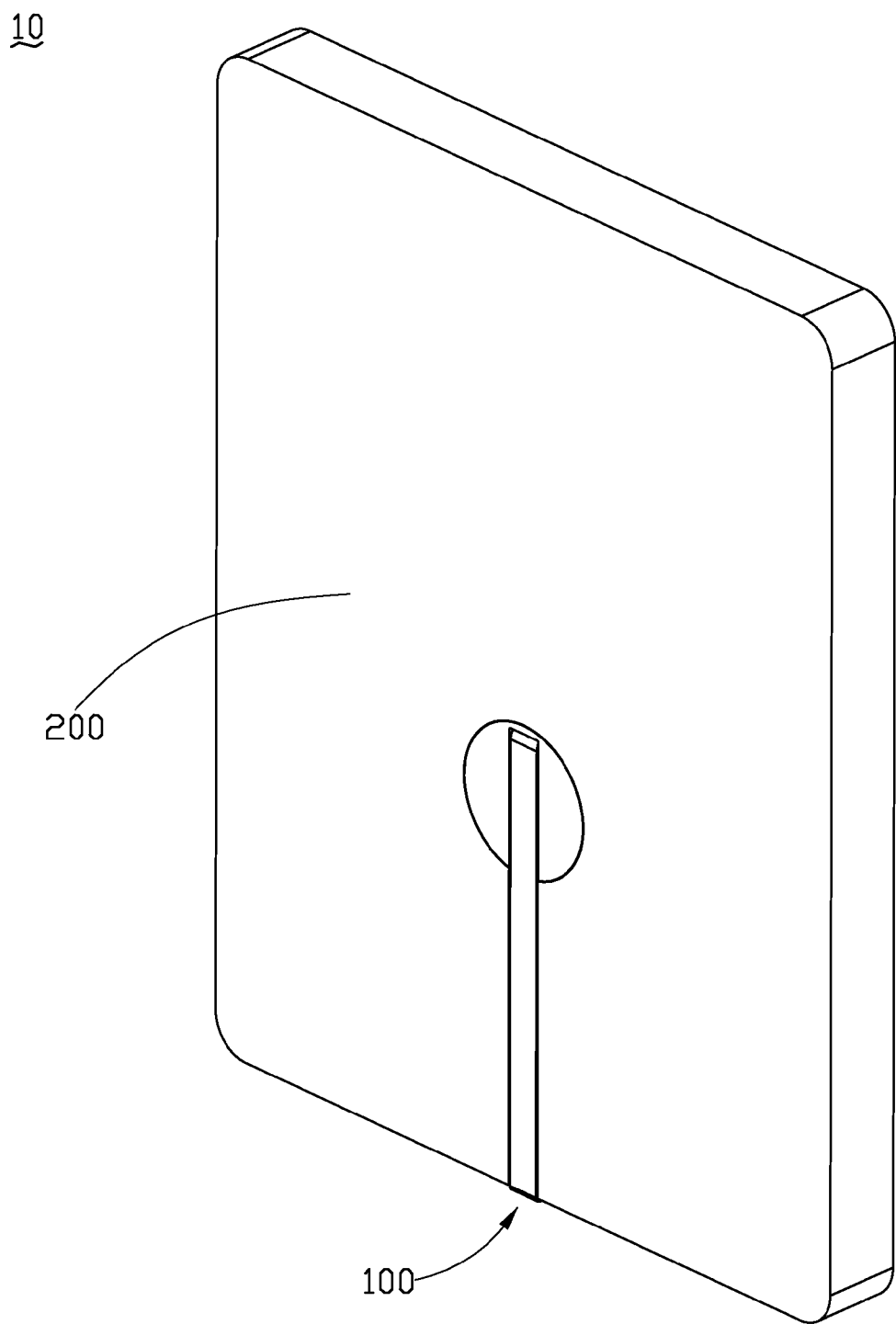
FIG. 1 is an isometric view of an electronic device, according to one embodiment.

Referring to FIG. 1, an electronic device 10, according to an embodiment, includes a main body 200 and a support 100. In this embodiment, the electronic device 10 is, but not limited to, an electronic photo frame.

Figure 2:
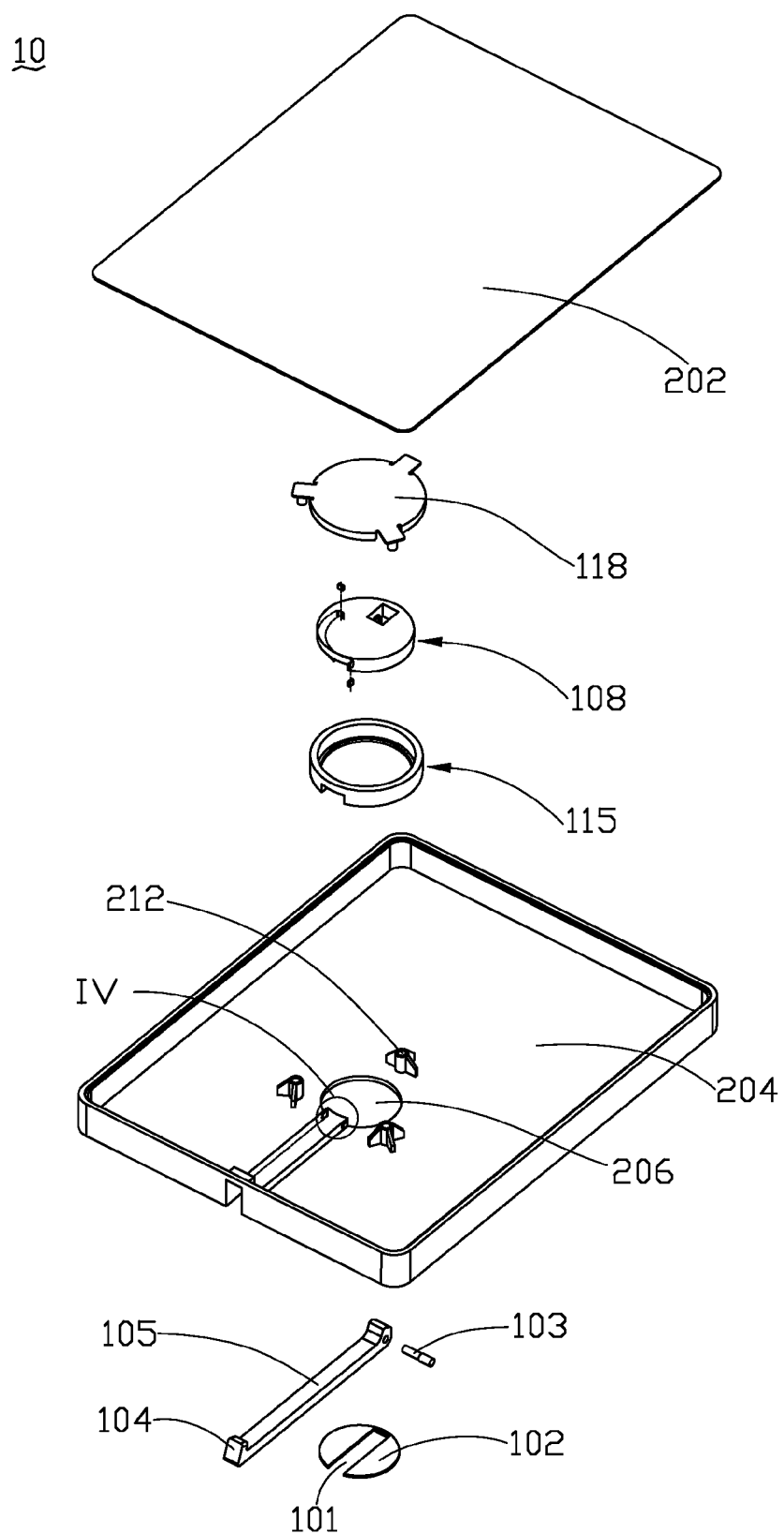
FIG. 2 is an exploded view of the electronic device of FIG. 1.
Figure 3:
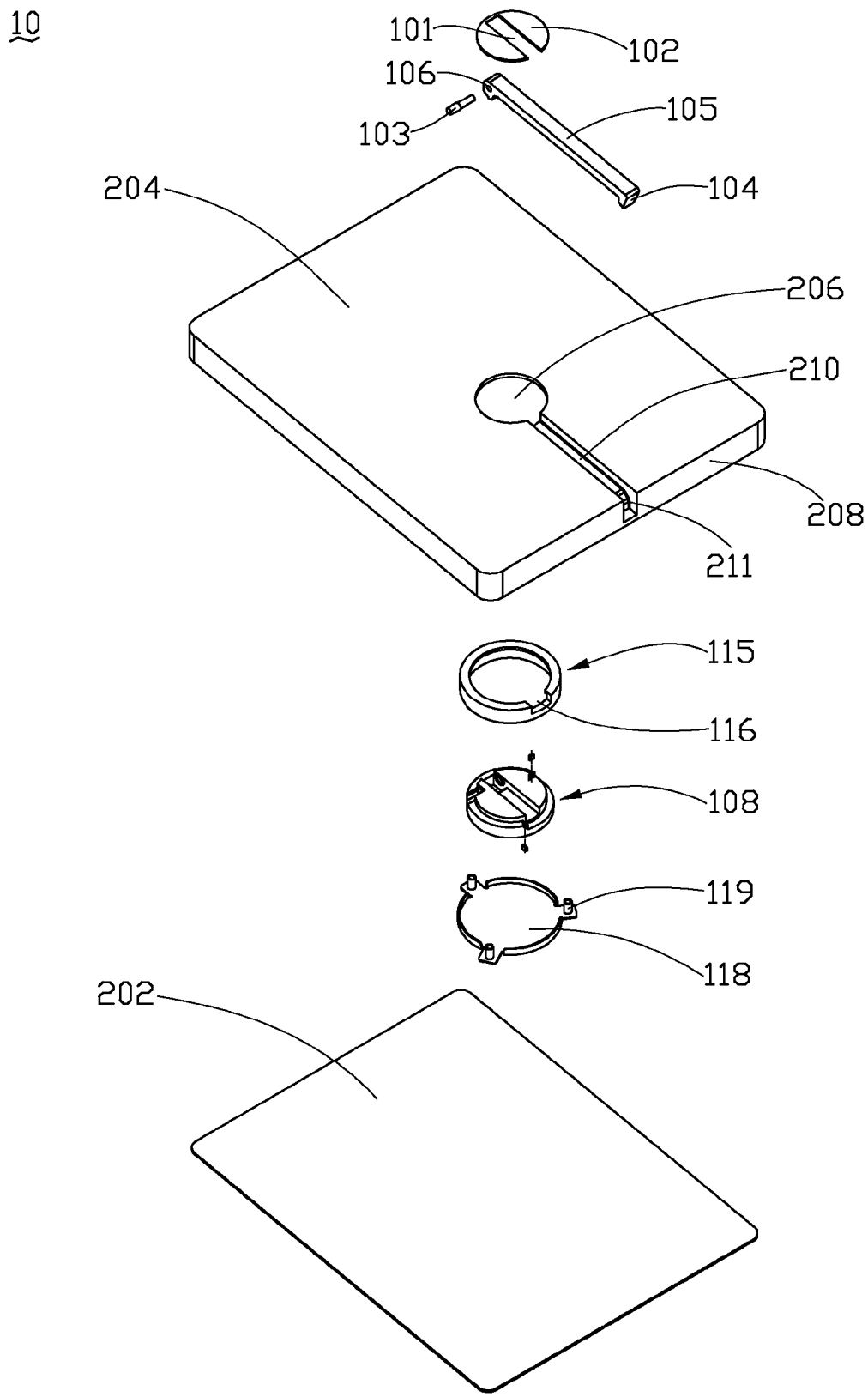
FIG. 3 is another exploded view of the electronic device of FIG. 1, viewed from another perspective.

Referring also to FIGS. 2-3, the main body 200 includes a case 204 and a cover 202. The case 204 is substantially a hollow cuboid configuration with an opening (not labeled). Various components of the electronic device 10 (not shown) can be placed into the case 204 via the opening and can be received within the case 204. The cover 202 is attached on the case 204, covering the opening. Thus, the case 204 and the cover 202 cooperatively define a sealed space (not labeled) to accommodate and protect the components of the electronic device 10.

The case 204 defines a substantially circular through hole 206 in its bottom. The case 204 also defines an elongated recess 210 in an outer surface of its bottom. The elongated recess 210 communicates with the circular through hole 206, extends along the longitudinal direction of the case 204, and includes an open end 211 in a sidewall of the case 204. In another embodiment, the elongated recess 210 may extend along the transverse direction of the case 204. In addition, the case 204 includes three fastener-receiving rods 212 protruding from inner surface of its bottom and arranged around the circular through hole 206.

Figure 4:
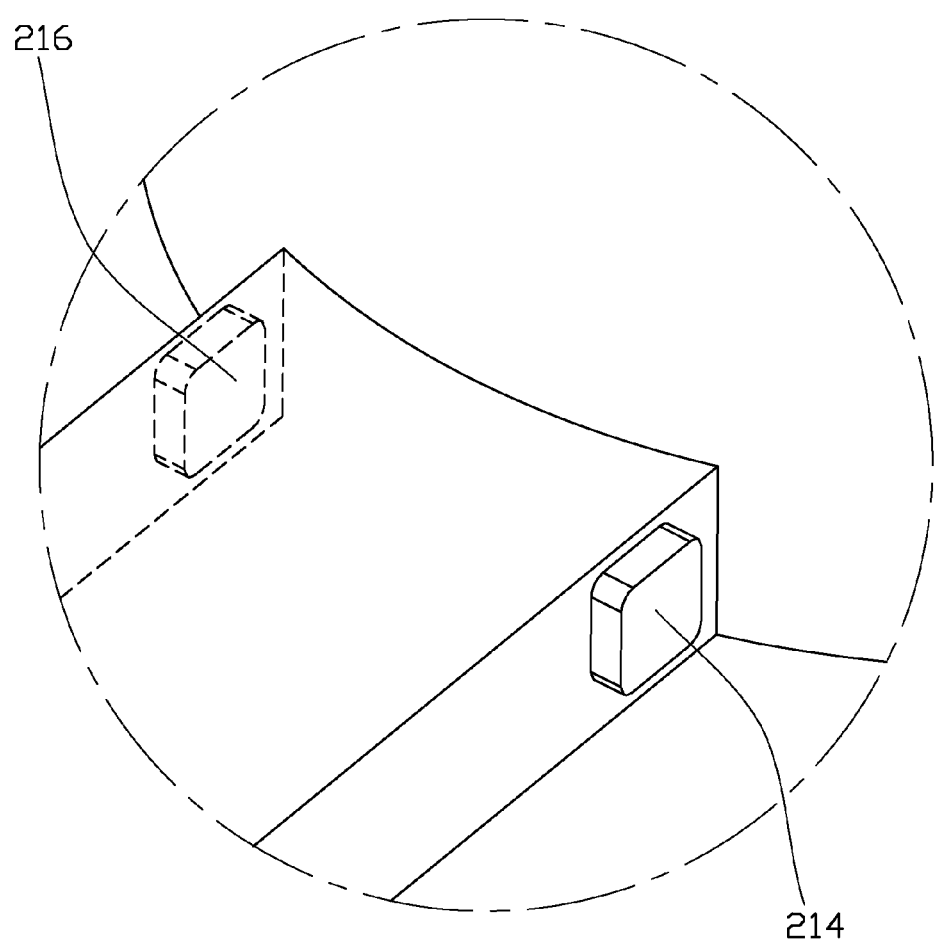
FIG. 4 is an enlarged view of a portion IV of FIG. 2.
Figure 5:
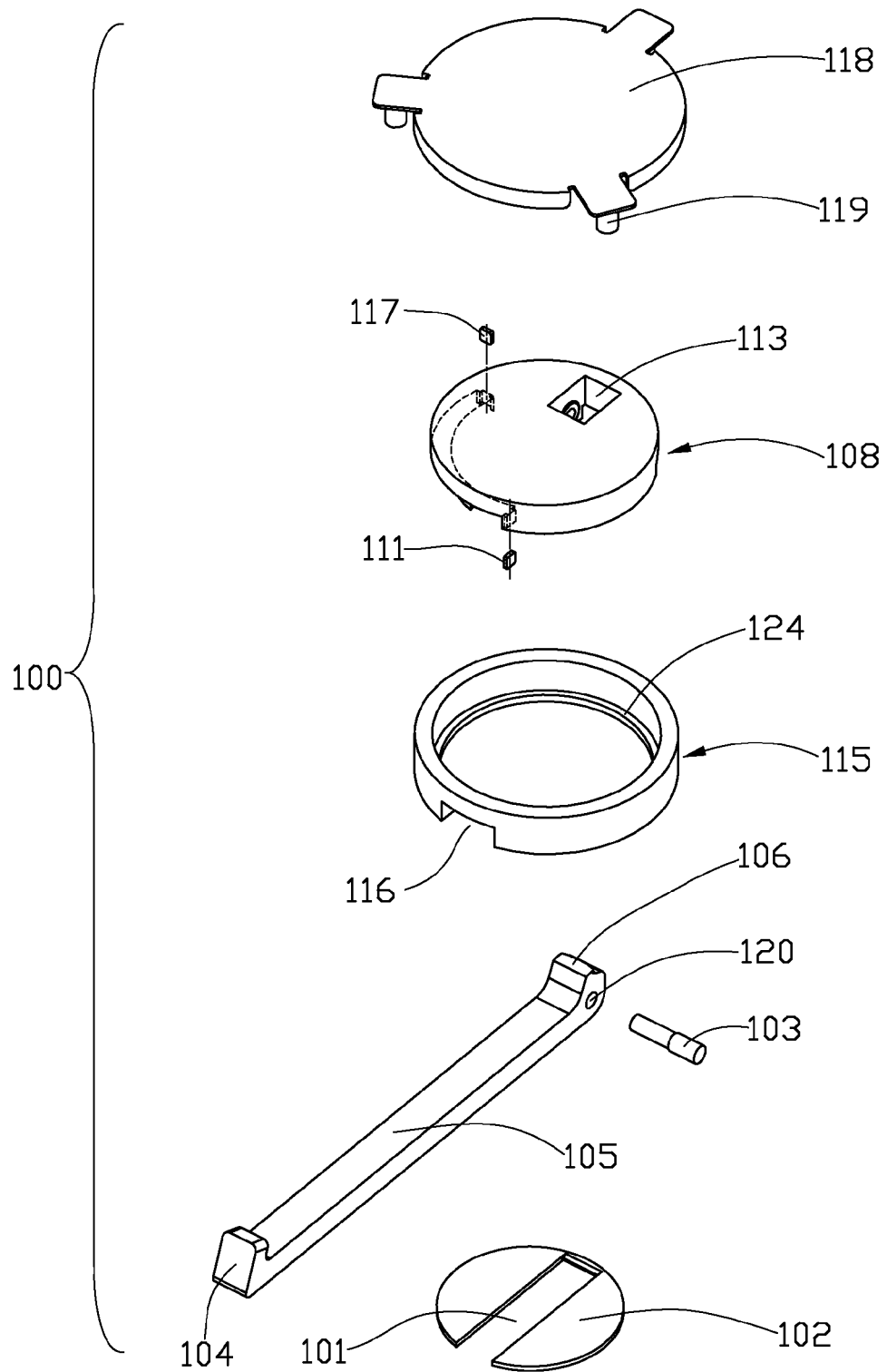
FIG. 5 is an enlarged exploded view of a support of the electronic device of FIG. 1.
Figure 6:
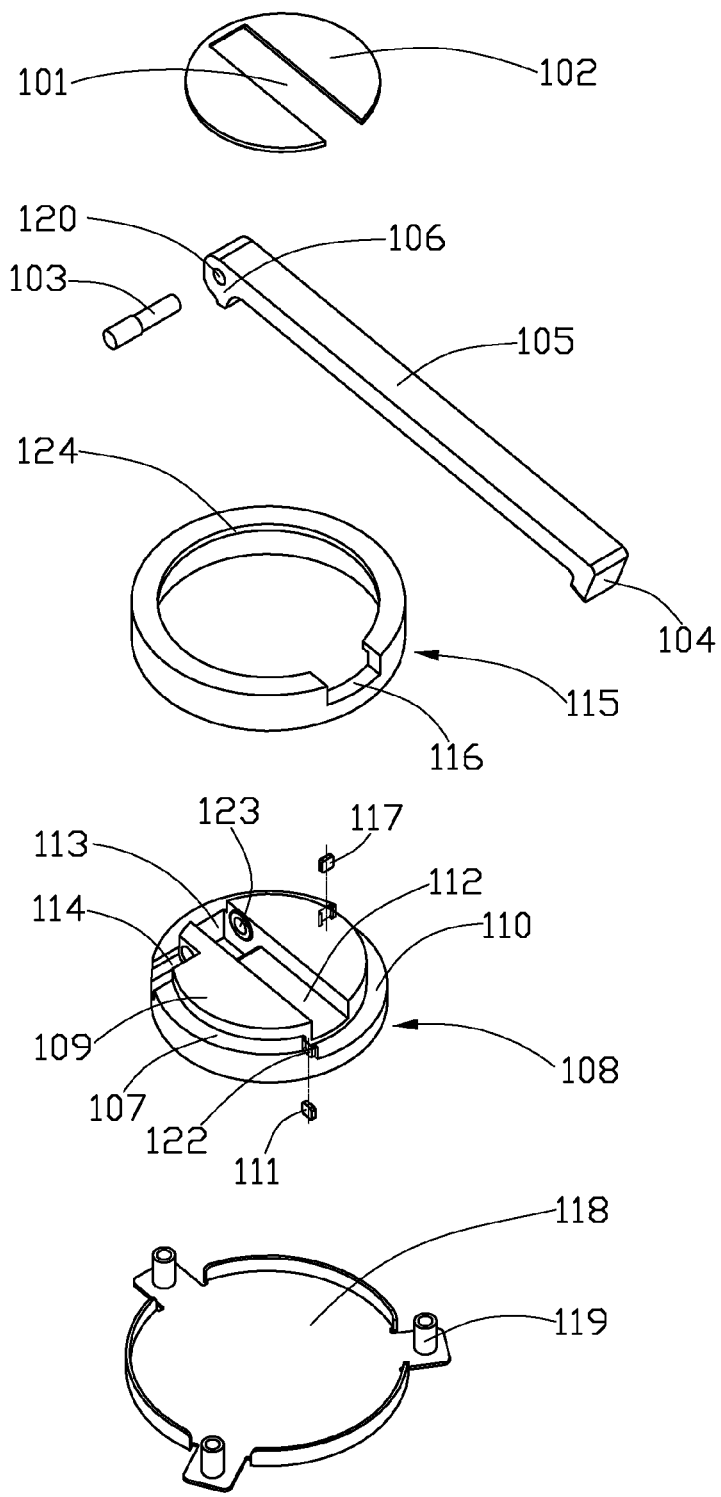
FIG. 6 is another enlarged exploded view of the support of the electronic device of FIG. 1, viewed from another perspective.

Referring to FIGS. 4-6, the support 100 includes a rotary socket 108, a retaining ring 115, a fixing cover 118, a support member 105, a shaft 103, a sealing cover 102, and four magnets 111, 117, 214, and 216.

Figure 7:
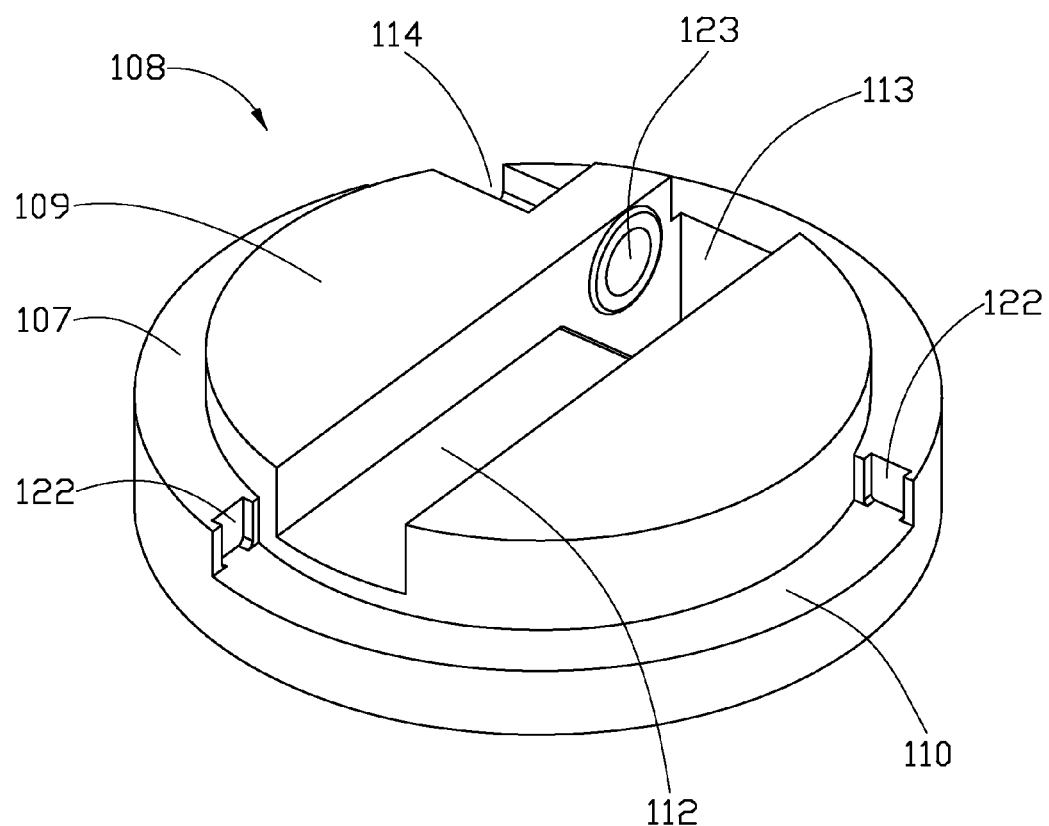
FIG. 7 is an isometric view of a rotary socket of the support of FIG. 5.
Figure 8:
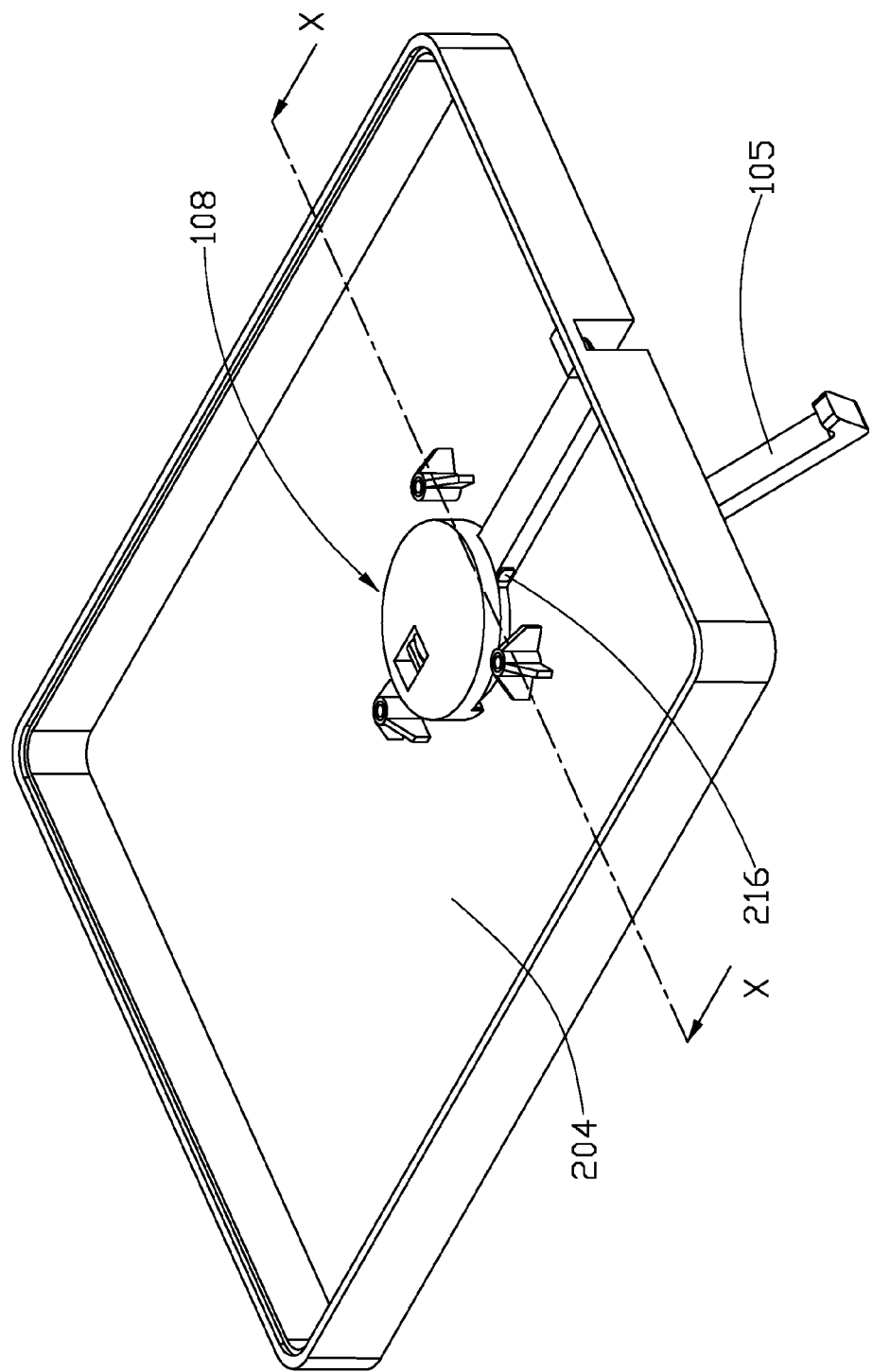
FIG. 8 shows the internal structure of the electronic device of FIG. 1, with some components omitted for clarity, when a support member of the support of FIG. 5 is in a first position.
Figure 9:
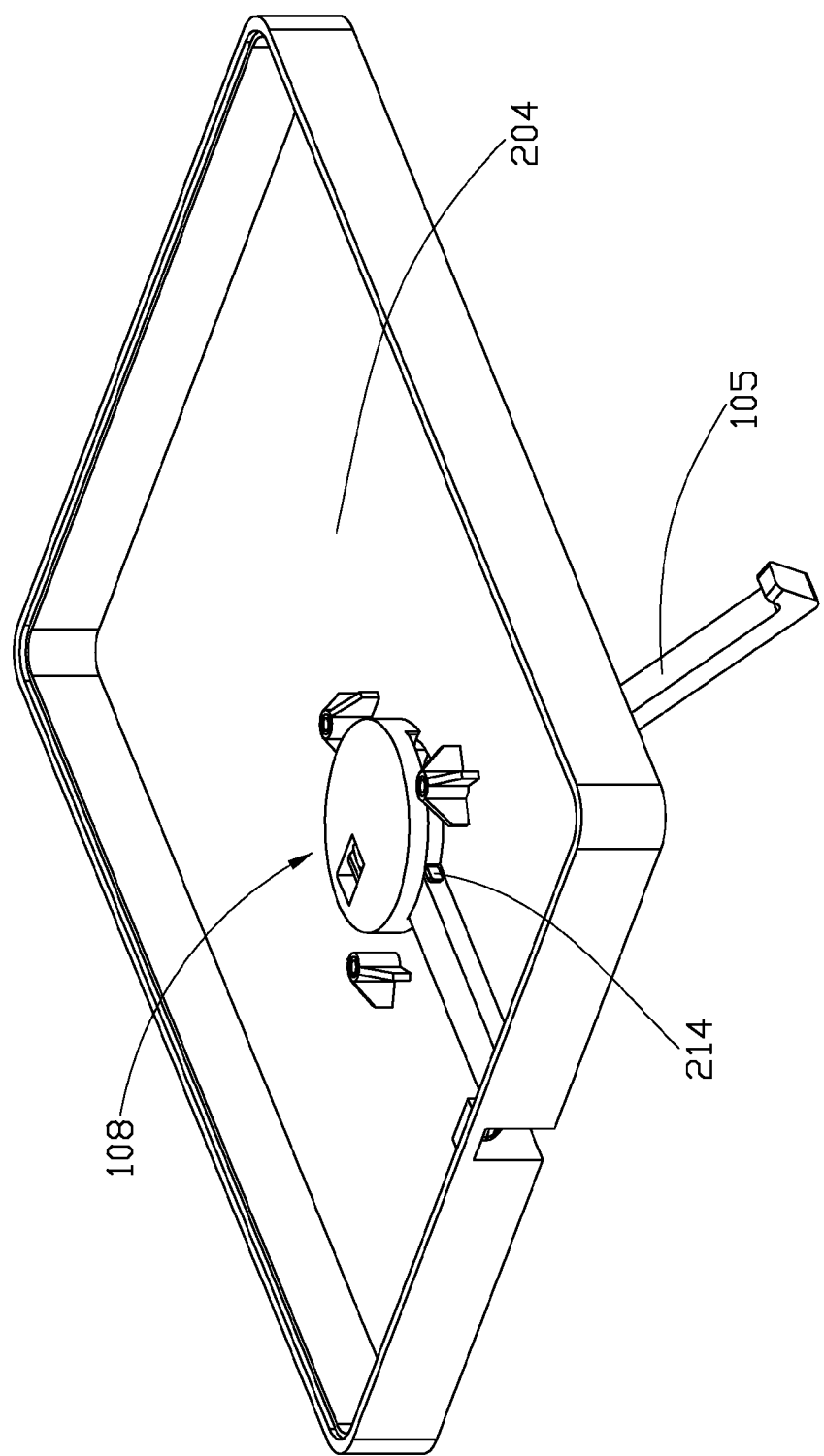
FIG. 9 is similar to FIG. 8, wherein the support member of FIG. 8 in a second position.

Referring to FIGS. 7-9, the rotary socket 108 is substantially cylindrical and includes a circular base 107 and an upper circular portion 109 stacked on the base 107. The diameter of the circular portion 109 is substantially equal to or slightly smaller than that of the circular through hole 206 and is smaller than that of the circular base 107. The circular portion 109 defines a receiving slot 112 running radially therethrough. A rectangular through hole 113 is defined in a bottom of the receiving slot 112. Two first shaft holes 123 are respectively defined in opposite side surfaces (not labeled) of the rectangular though hole 113. The circular base 107 defines an insertion slot 114 in a lateral surface and communicates with the receiving slot 112 through one of the first shaft holes 123. The circular base 107 also defines a recess 110 in its upper surface that extends around the circular portion 109. The length of the recess 110 is about one third the length of the periphery of the circular base 107. The recess 110 includes two ends, each of which defines an indentation 122.

Referring back to FIGS. 5-6, the inner diameter of the retaining ring 115 is substantially equal to or slightly larger than that of the circular base 107. The retaining ring 115 defines an annular groove 124 in the inner surface (not labeled) at one end. The inner diameter of the annular groove 124 is smaller than that of the circular base 107, but larger than that of the circular portion 109. The retaining ring 115 defines a notch 116 at the end where the annular groove 124 is formed.

The fixing cover 118 is generally a circular plate with three tabs (both not labeled) extending outward from the periphery of the circular plate and arranged corresponding to the fastener-receiving rods 212.

The support member 105 is an elongated bar shaped to be fittingly received in the receiving groove 112, the notch 116, and the elongated recess 210 (see FIG. 3). The support member 105 includes a rotation end 106 and a support end 104. The rotation end 106 is shaped to be fittingly and rotatably inserted into the rectangular through hole 113 and defines a second shaft hole 120 therethrough. The support end 104 is shaped to be fittingly received in the open end 211 (see FIG. 3).

The sealing cover 102 is generally circular and shaped to be fittingly received in the circular through hole 206. The sealing cover 102 defines an open-ended slot 101.

When assembling, two of the magnets 214 and 216 (see FIG. 4) are respectively attached to opposite side surfaces (not labeled) of the elongated recess 210, close to the circular through hole 206. The other two magnets 111 and 117 are respectively received in the indentations 122.

The rotary socket 108 is disposed on the base of the case 204. The circular portion 109 is aligned with and fitted into the circular through hole 206. The rotation end 106 is received in the rectangular through hole 113 with the first shaft holes 123 aligned with the second shaft hole 120. The shaft 103 passes through the insertion slot 114, one of the first shaft holes 123, the second shaft hole 120, and the other first shaft hole 123 sequentially, to rotatably connect the support member 105 to the rotary socket 108. Upon assembly, the support 100 can be received in the elongated recess 210 with the support end 104 received in the open end 211.

Figure 10:
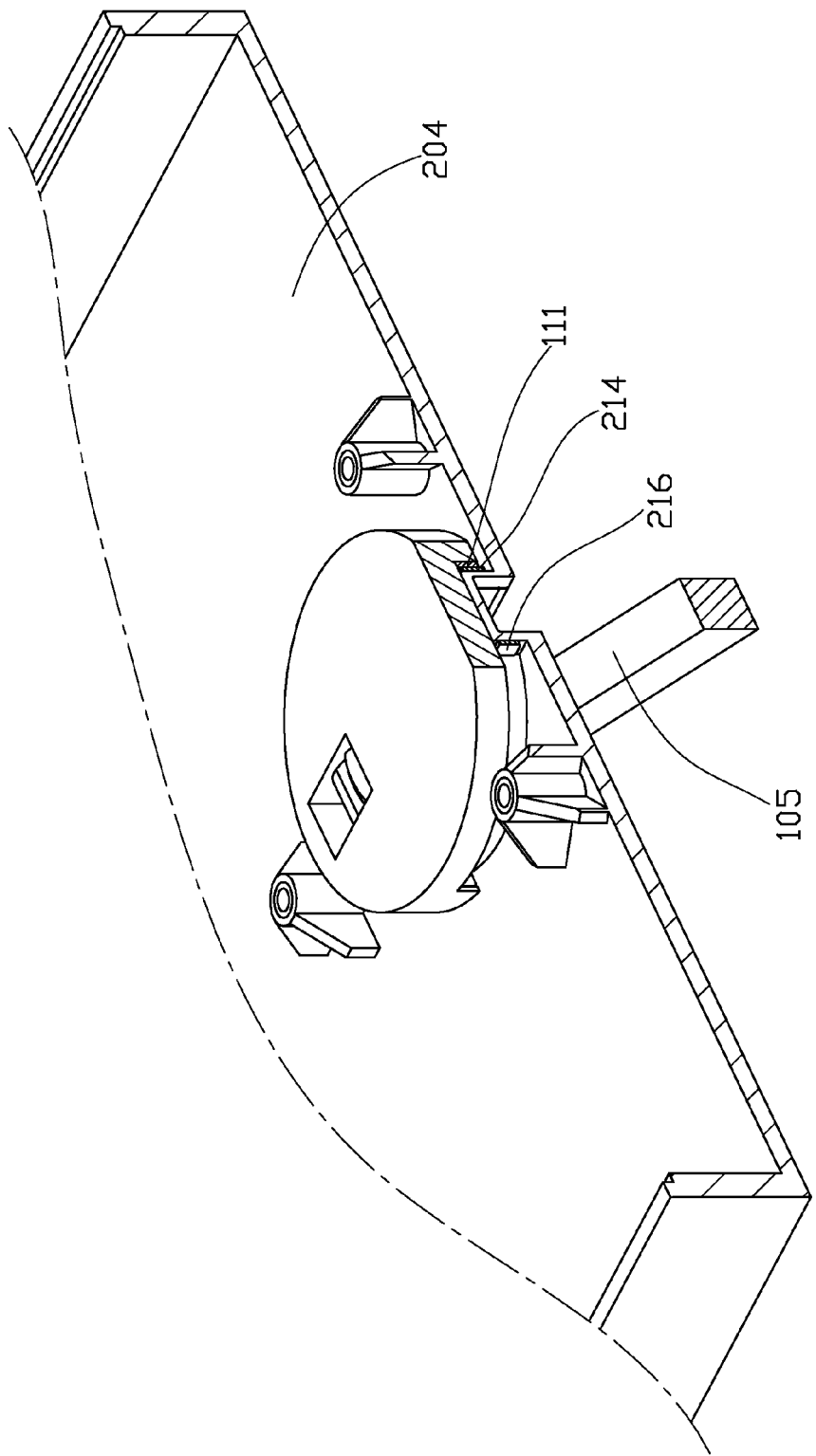
FIG. 10 is a cross-sectional view of the electronic device of FIG. 1, taken along line X-X of FIG. 8.
Figure 11:
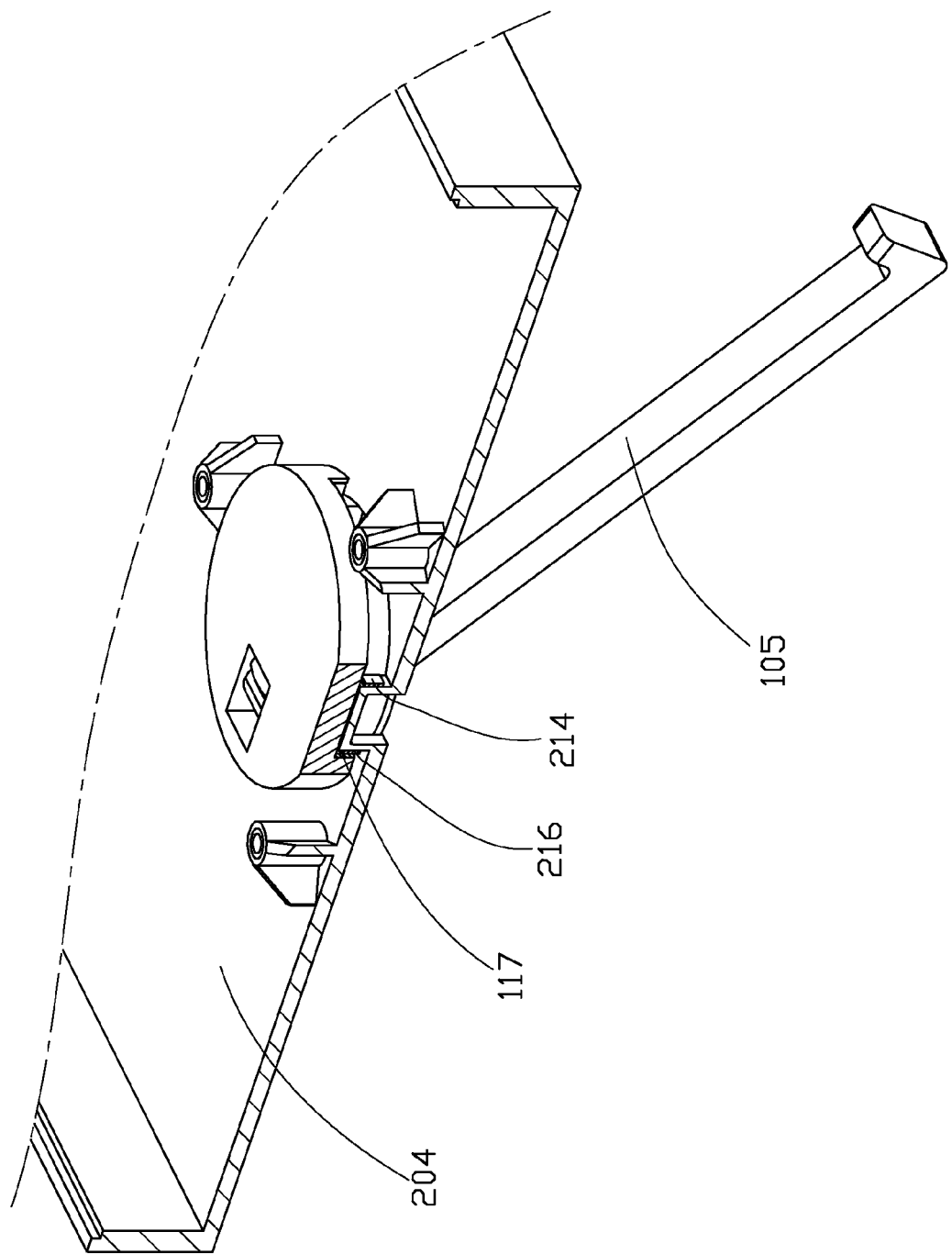
FIG. 11 is a cross-sectional view of the electronic device of FIG. 1, taken along line X-X of FIG. 8, wherein the support member of FIG. 8 in a second position.

The retaining ring 115 is arranged around the rotary socket 108 with the support member 105 received in the notch 116. As such, the rotary socket 108 is limited to rotate within the retaining ring 115. The recess 110 defines a range of the rotation of the rotary socket 108. Referring to FIGS. 10 and 11, the rotary socket 108 can be held in position by the attractive force between one of the two magnets 111 and 214 and one of the two magnets 117 and 216.

The fixing cover 118 is disposed on the retaining ring 115 with the ears aligned with the fastener-receiving rods 212. Three fasteners 119 pass through the ears and are threadedly received respectively in the fastener-receiving rods 212. As such, the rotary socket 108 and the retaining ring 115 are fixed to the case 204 via the fixing cover 118.

The sealing cover 102 is then received within the circular through hole 206 to cover the circular portion 109, with the slot 101 aligned with the elongated recess 210, allowing the passage of the support member 105. The cover 202 can be connected to the case 204 by any suitable conventional connection techniques. The slot 101 is aligned with the support member 105. Finally, the cover 202 is attached to the case 204.

Figure 12:
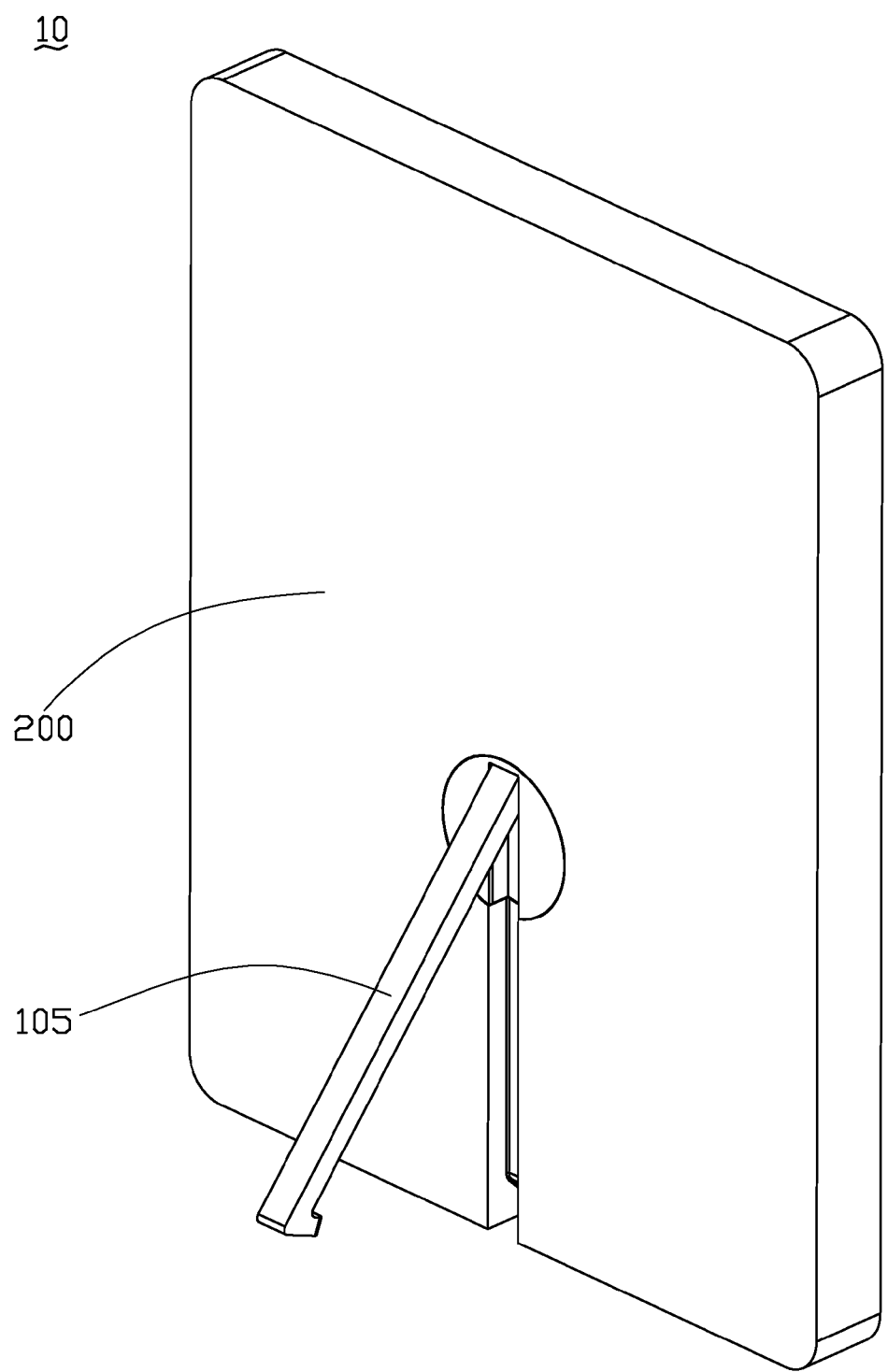
FIG. 12 shows the electronic device of FIG. 1 in a first position.
Figure 13:
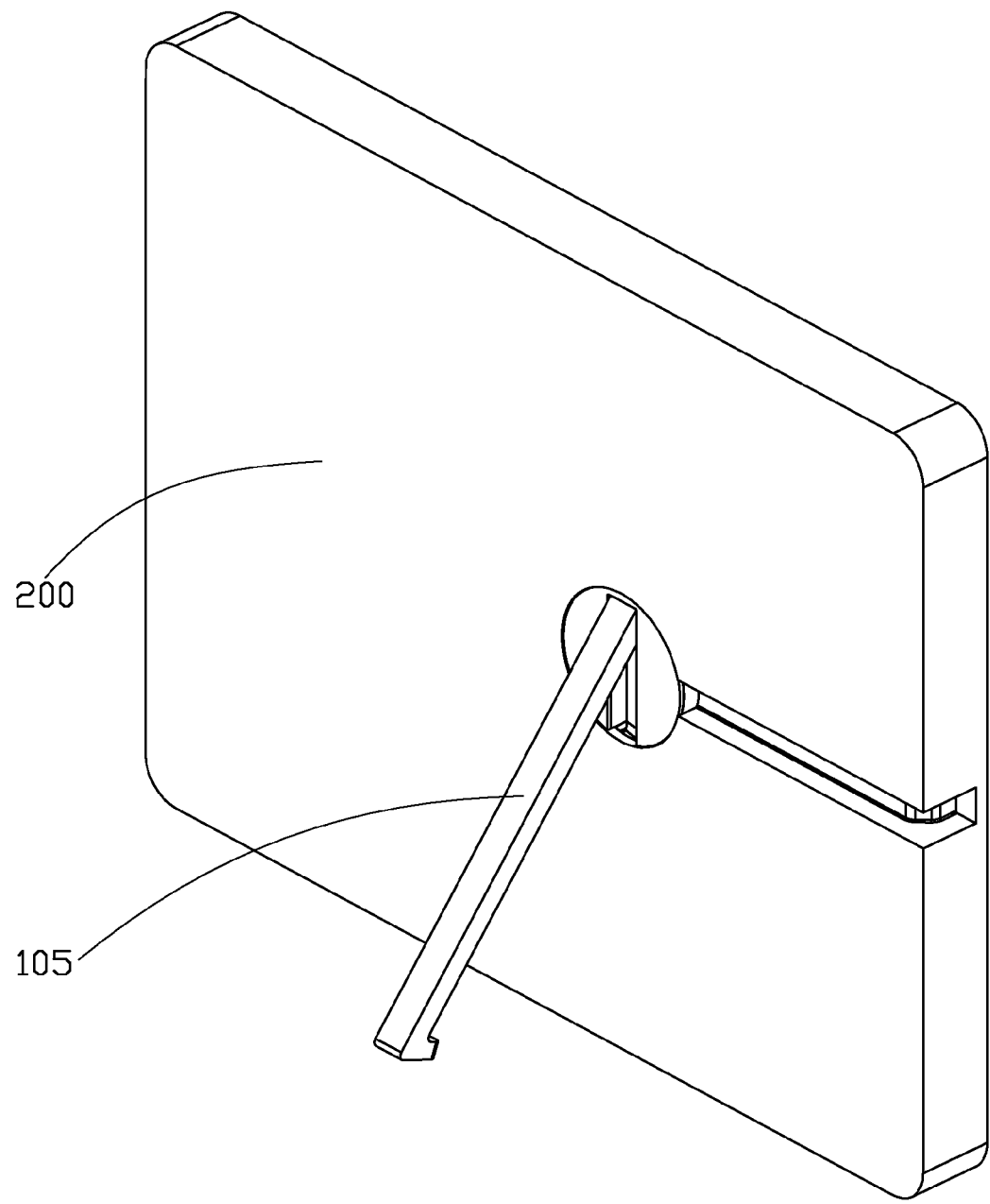
FIG. 13 shows the electronic device of FIG. 1 in a second position.

Referring to FIG. 12, the support member 105 can be moved out of the elongated recess 210 to support the electronic device 10 in a portrait orientation. The support member 105 can be rotated about 90 degrees to a position where the magnet 117 contacts the magnet 216, when needed, to support the electronic device 10 in a landscape orientation (see FIG. 13).

It will be understood that the above particular embodiments and methods are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. An electronic device comprising:
a main body, wherein the main body is hollow and defines a substantially circular through hole in a bottom wall thereof; and
a support comprising a rotary socket, a retaining ring, a fixing cover, a support member, and a shaft; wherein the rotary socket and the retaining ring are mounted to the main body via the fixing cover, the rotary socket is limited to rotate within the retaining ring, and the shaft rotatably connects the support member to the rotary socket, the support member is capable of being rotated to support the electronic device in a landscape orientation and a portrait orientation; and
wherein the rotary socket comprises a circular base and an upper circular portion stacked on the circular base, the circular portion is aligned with and fitted into the circular through hole; the circular portion defines a receiving slot running radially, a rectangular through hole is defined in a bottom of the receiving slot, two first shaft holes are defined in opposite side surfaces of the rectangular though hole, respectively, the circular base defines an insertion slot in a lateral surface and communicates with the receiving slot through one of the first shaft holes.

2. The electronic device according to claim 1, wherein the diameter of the circular portion is substantially equal to or slightly smaller than that of the circular through hole and is smaller than that of the circular base.

3. The electronic device according to claim 1, wherein the circular base defines a recess in its upper surface that extends around the circular portion, the recess comprises two ends, each of which defines an indentation.

4. The electronic device according to claim 3, wherein the length of the recess is about one third of the length of the periphery of the circular base.

5. The electronic device according to claim 3, wherein the main body is cuboid shaped and defines an elongated recess in an outer surface of the bottom wall, the elongated recess communicates with the circular through hole, extends along either the longitudinal direction or the transverse direction of the main body, and includes an open end in a sidewall of the main body.

6. The electronic device according to claim 5, wherein two magnets are attached to opposite side surfaces of the elongated recess, respectively, close to the circular through hole; other two magnets are received in the indentations, respectively; the rotary socket can be held in position by the attractive force between one of the two magnets attached to opposite side surfaces of the elongated recess and one of the two magnets received in the indentations.

7. The electronic device according to claim 5, wherein the main body comprises three fastener-receiving rods protruding from inner surface of its bottom and arranged around the circular through hole, the fixing cover is generally a circular plate with three ears extending outward from the periphery of the circular plate and arranged corresponding to the fastener-receiving rods.

8. The electronic device according to claim 1, wherein the inner diameter of the retaining ring is substantially equal to or slightly larger than that of the circular base.

9. The electronic device according to claim 1, wherein the retaining ring defines an annular groove in the inner surface at one end, the inner diameter of the annular groove is smaller than that of the circular base, but larger than that of the circular portion.

10. The electronic device according to claim 9, wherein the retaining ring defines a notch at the end where the annular groove is formed, the retaining ring is arranged around the rotary socket with the support member received in the notch, thereby the rotary socket is limited to rotate within the retaining ring.

11. The electronic device according to claim 1, wherein the support member comprises a rotation end and a support end;
the rotation end is shaped to be fittingly and rotatably inserted into the rectangular through hole and defines a second shaft hole;
the support end is shaped to be fittingly open end received in the open end and received in the rectangular through hole with the first shaft holes aligned with the second shaft hole; and the shaft passes through the insertion slot, one of the first shaft hole, the second shaft hole, and the other first shaft hole sequentially to rotatably connect the support member to the rotary socket.

* * * * *